United States Patent
Lin et al.

(10) Patent No.: US 11,067,882 B2
(45) Date of Patent: Jul. 20, 2021

(54) ILLUMINATION SYSTEM AND PROJECTION APPARATUS

(71) Applicant: Coretronic Corporation, Hsin-Chu (TW)

(72) Inventors: Yao-Shun Lin, Hsin-Chu (TW); Hsuan-I Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/737,925

(22) Filed: Jan. 9, 2020

(65) Prior Publication Data
US 2020/0233289 A1    Jul. 23, 2020

(30) Foreign Application Priority Data

Jan. 18, 2019 (CN) .......................... 201920083760.1

(51) Int. Cl.
*G03B 21/20*    (2006.01)

(52) U.S. Cl.
CPC ......... *G03B 21/204* (2013.01); *G03B 21/208* (2013.01)

(58) Field of Classification Search
CPC .............................. G03B 21/204; G03B 21/208
See application file for complete search history.

(56) References Cited

U.S. PATENT DOCUMENTS

| 6,870,650 B2 * | 3/2005 | Kappel ............... A61C 1/0061 348/E5.141 |
| 2009/0185141 A1 * | 7/2009 | Chen ...................... G02B 27/48 353/38 |
| 2009/0268168 A1 * | 10/2009 | Wang .................. G03B 21/2066 353/37 |
| 2012/0080411 A1 * | 4/2012 | Mizuyama ............. G02B 27/48 219/121.6 |
| 2012/0275174 A1 * | 11/2012 | Takahashi ............... H01S 5/005 362/487 |
| 2014/0340931 A1 * | 11/2014 | Nishitani ............. G02B 6/0061 362/609 |
| 2015/0077714 A1 * | 3/2015 | Hsieh ..................... G02B 5/001 353/31 |

FOREIGN PATENT DOCUMENTS

| CN | 1732403 | 2/2006 |
| CN | 104460202 | 4/2017 |

* cited by examiner

*Primary Examiner* — Bryon T Gyllstrom
*Assistant Examiner* — Christopher E Dunay
(74) *Attorney, Agent, or Firm* — JCIPRNET

(57) ABSTRACT

An illumination system including an exciting light source module, a wavelength converter and an anisotropic diffusion element is provided. The exciting light source module is configured to emit an exciting beam. The wavelength converter is disposed on a transmission path of the exciting beam. The anisotropic diffusion element is disposed on the transmission path of the exciting beam and is located between the exciting light source module and the wavelength converter. The anisotropic diffusion element allows the passing exciting beam to expand in a light expanding direction, and the light expanding direction is substantially parallel to a fast axis of the exciting beam. A projection apparatus including the illumination system is also provided.

18 Claims, 6 Drawing Sheets

ILLUMINATION SYSTEM AND PROJECTION APPARATUS

CROSS-REFERENCE TO RELATED APPLICATION

This application claims the priority benefit of China application serial no. 201920083760.1, filed on Jan. 18, 2019. The entirety of the above-mentioned patent application is hereby incorporated by reference herein and made a part of this specification.

BACKGROUND OF THE INVENTION

Field of the Invention

The disclosure relates to an optical system and an optical apparatus, and more particularly, to an illumination system and a projection apparatus using the illumination system.

Description of Related Art

With the development of optical technology, solid-state lighting technologies such as light emitting diodes (LEDs) and laser diodes (LDs) have become more and more widely used for light sources of projectors, among which the laser diodes provide beams with a higher intensity than the light emitting diodes to be used as light sources of projectors. Therefore, how to use the high-intensity beam provided by laser diodes as pure color light sources for projectors is a major issue at present.

The use of high-intensity laser light emitted from the laser diode to excite the phosphor of the wavelength conversion module is one of the common techniques in the current application of the laser diode as a light source. The light spot formed by the semiconductor laser is approximately elliptical, and its light intensity distribution is close to the Gaussian distribution. Because the light spot formed by the laser light having a light intensity close to the Gaussian distribution has a higher light intensity per unit area in the center, the temperature of the phosphor is overly high, resulting in a decrease in the conversion efficiency of the phosphor. Besides, the light spot with a light intensity overly concentrated is also more likely to cause the phosphor to burn out or to shorten the life of the phosphor.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The present invention provides an illumination system having a better illumination uniformity, a better light efficiency and a longer life.

The present invention provides a projection apparatus having a better image quality, a better light efficiency and a longer life.

Other features and advantages of the embodiments of the disclosure are illustrated by the technical features broadly embodied and described as follows.

In order to achieve one of or a portion of or all of the objects or other objects, an embodiment of the disclosure provides an illumination system including an exciting light source module, a wavelength converter and an anisotropic diffusion element. The exciting light source module is configured to emit an exciting beam. The wavelength converter is disposed on a transmission path of the exciting beam. The anisotropic diffusion element is disposed on the transmission path of the exciting beam, and is located between the exciting light source module and the wavelength converter, wherein the anisotropic diffusion element allows the passing exciting beam to expand in a light expanding direction, and the light expanding direction is substantially parallel to a fast axis of the exciting beam.

In order to achieve one of or a portion of or all of the objects or other objects, an embodiment of the disclosure provides a projection apparatus including the above illumination system, light valve, and projection lens. The illumination system is configured to emit an illumination beam. The light valve is disposed on a transmission path of the illumination beam for modulating the illumination beam into an image beam. The projection lens is disposed on a transmission path of the image beam.

Based on the above, in the illumination system and the projection apparatus of the embodiment of the present disclosure, the anisotropic diffusion element may allow the passing exciting beam to expand in the light expanding direction, and the light expanding direction is substantially parallel to the fast axis of the exciting beam, so when the wavelength converter is illuminated by the exciting beam passing the anisotropic diffusion element, the energy intensity distribution of a light spot formed by the exciting beam on the wavelength converter is not excessively concentrated in the center, which may prevent the conversion efficiency of the wavelength converter from reducing and prevent the wavelength converter from burning out. Therefore, the illumination system according to the embodiments of the disclosure has a better illumination uniformity, a better light efficiency and a longer life. Accordingly, the projection apparatus according to the embodiments of the disclosure, which includes the aforementioned illumination system, has a better image quality, a better light efficiency and a longer life.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
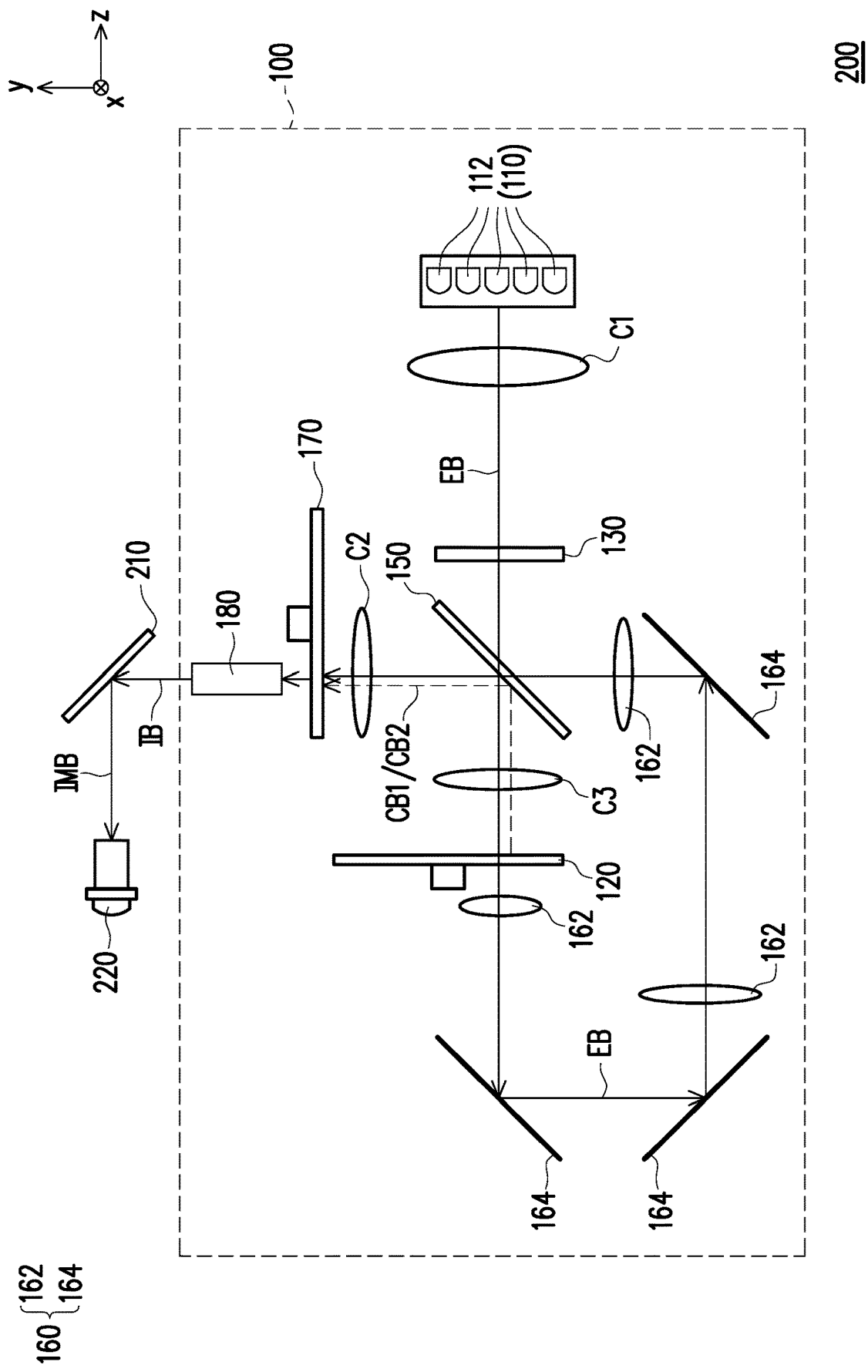
FIG. 1 is a schematic view of a projection apparatus according to an embodiment of the disclosure.

FIG. 1 is a schematic view of a projection apparatus according to an embodiment of the disclosure. Referring to FIG. 1, a projection apparatus 200 of this embodiment includes an illumination system 100. The illumination system 100 is configured to provide an illumination beam IB, and the illumination system 100 includes an exciting light source module 110, a wavelength converter 120 and an anisotropic diffusion element 130. The exciting light source module 110 is configured to emit an exciting beam EB. The wavelength converter 120 and the anisotropic diffusion element 130 are both disposed on a transmission path of the exciting beam EB, and the anisotropic diffusion element 130 is located between the exciting light source module 110 and the wavelength converter 120.

In this embodiment, the exciting light source module 110 is generally referred to as a light source capable of emitting a short-wavelength beam. A peak wavelength of the short-wavelength beam, for example, falls within the wavelength range of the blue light or the wavelength range of the ultraviolet light, as the peak wavelength is defined as a wavelength corresponding to where the maximum light intensity is. The exciting light source module 110 includes a laser diode (LD), a light emitting diode (LED), or an array or a group of the two, but the disclosure is not limited thereto. In this embodiment, the exciting light source module 110 is a laser light emitting element including a laser diode. For example, the exciting light source module 110 may be a blue laser diode bank, and the exciting beam EB may be a blue laser beam, but the disclosure is not limited thereto.

Figure 2:
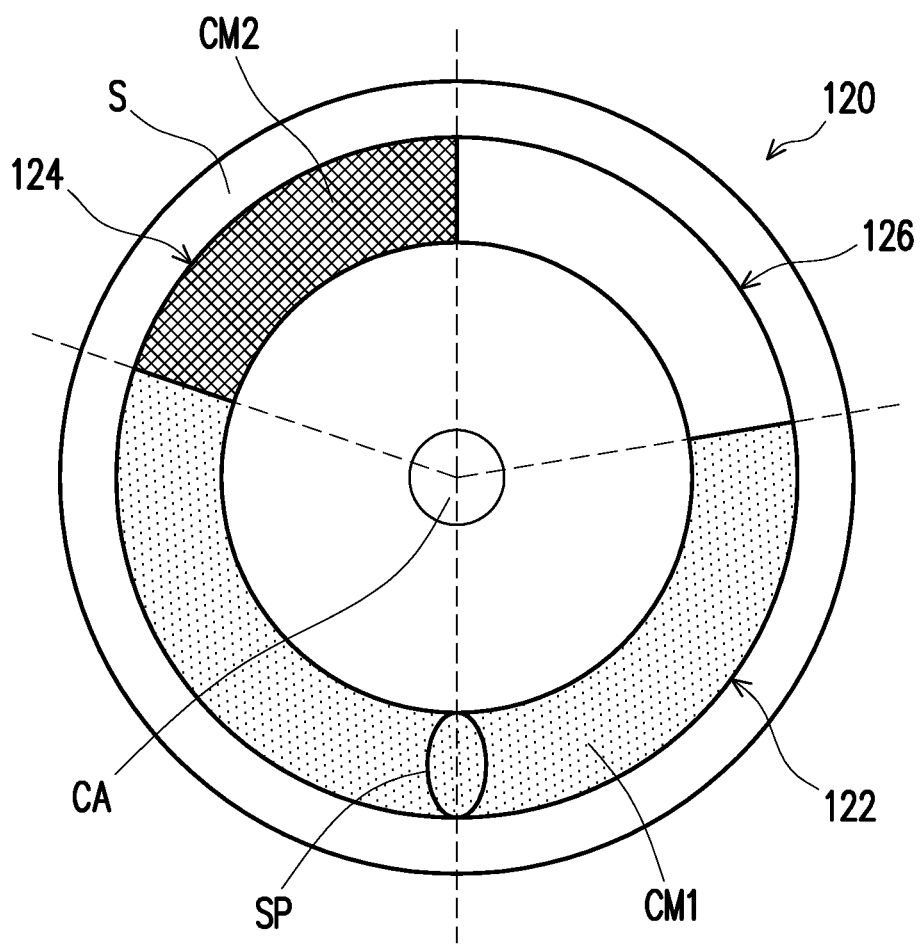
FIG. 2 is a schematic front view of a wavelength converter of the projection apparatus of FIG. 1.

FIG. 2 is a schematic front view of a wavelength converter of the projection apparatus of FIG. 1. Referring to FIG. 1 and FIG. 2, in this embodiment, the wavelength converter 120 may be a rotatable disk-shaped element, for example, a phosphor wheel. The wavelength converter 120 includes at least one wavelength conversion area (FIG. 2 is an example of two wavelength conversion areas 122 and 124) and at least one light transmission area (FIG. 2 is an example of one light transmission area 126) and the short-wavelength beam transmitted to the wavelength conversion area of the wavelength converter 120 may be converted to a long-wavelength beam. Specifically, the wavelength converter 120 includes a substrate S. The substrate S has a wavelength conversion area 122, a wavelength conversion area 124 and a light transmission area 126 arranged in a ring shape, and the substrate S is, for example, a reflective substrate. A wavelength conversion substance CM1 is disposed in the wavelength conversion area 122, and the wavelength conversion substance CM1 is, for example, yellow phosphor. A blue laser beam (exciting beam EB) incidents on the wavelength conversion substance CM1 of the wavelength conversion area 122, and the yellow phosphor may be excited by the blue laser beam (exciting beam EB) and emits a yellow beam. A wavelength conversion substance CM2 is disposed in the wavelength conversion area 124, and the wavelength conversion substance CM2 is, for example, green phosphor. The green phosphor may be excited by the blue laser beam (exciting beam EB) and emits a green beam. The light transmission area 126 is, for example, an area formed by a transparent plate embedded in the substrate S, or a through hole penetrating the substrate S. In this embodiment, the wavelength converter 120 is configured to rotate around a central axis CA, and when the wavelength converter 120 rotates around the central axis CA, the adjacently disposed wavelength conversion area 122, wavelength conversion area 124 and light transmission area 126 cut into the transmission path of the exciting beam EB in turns. When the wavelength conversion area 122 and the wavelength conversion area 124 sequentially cut into the transmission path of the exciting beam EB, the exciting beam EB incident on the wavelength conversion substance CM1 of the wavelength conversion area 122 and the wavelength conversion substance CM2 of the wavelength conversion area 124 is converted into a conversion beam CB1 and a conversion beam CB2, respectively, and the conversion beam CB1 and conversion beam CB2 are reflected by a substrate S. When the light transmission area 126 cuts into the transmission path of the exciting beam EB, the exciting beam EB passes through the light transmission area 126 of the wavelength converter 120. In this embodiment, a wavelength of the conversion beam CB1 and a wavelength of the conversion beam CB2 are different from a wavelength of the exciting beam EB. The conversion beam CB1 is, for example, a yellow beam, and the conversion beam CB2 is, for example, a green beam. In other embodiments, the wavelength converter 120 may include other number of wavelength conversion areas for respectively converting the exciting beam EB into lights in different colors.

In other embodiments, the wavelength converter may include a wavelength conversion area and a non-wavelength conversion area, and the substrate is, for example, a reflective substrate without a light transmission area disposed, and the non-wavelength conversion area is, for example, an area directly reflecting the exciting beam. The disclosure is not limited thereto.

Figure 3A:
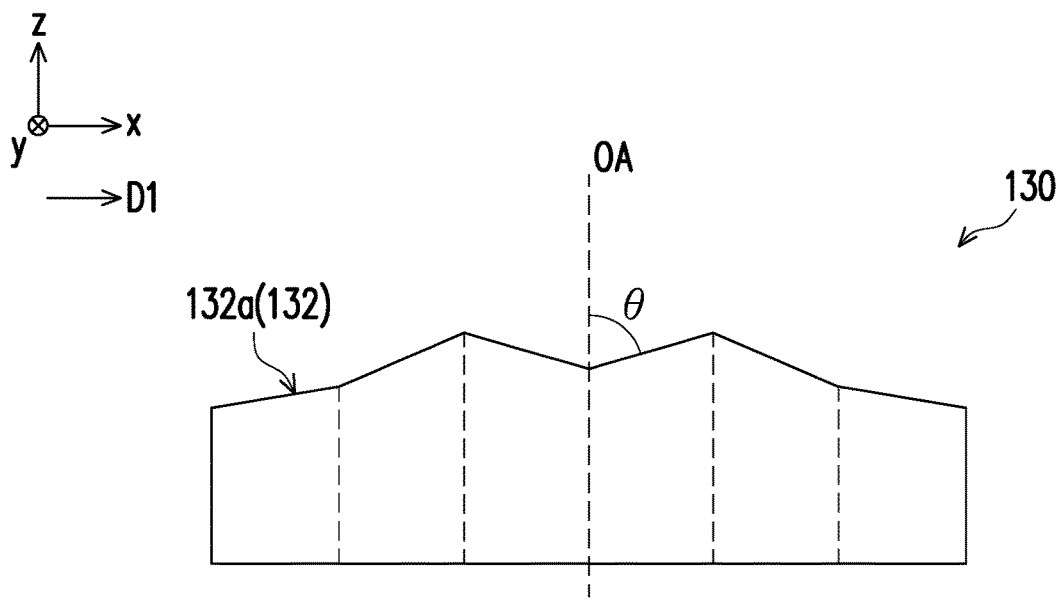
FIG. 3A is a schematic cross-sectional view of an anisotropic diffusion element of the projection apparatus of FIG. 1.
Figure 3B:
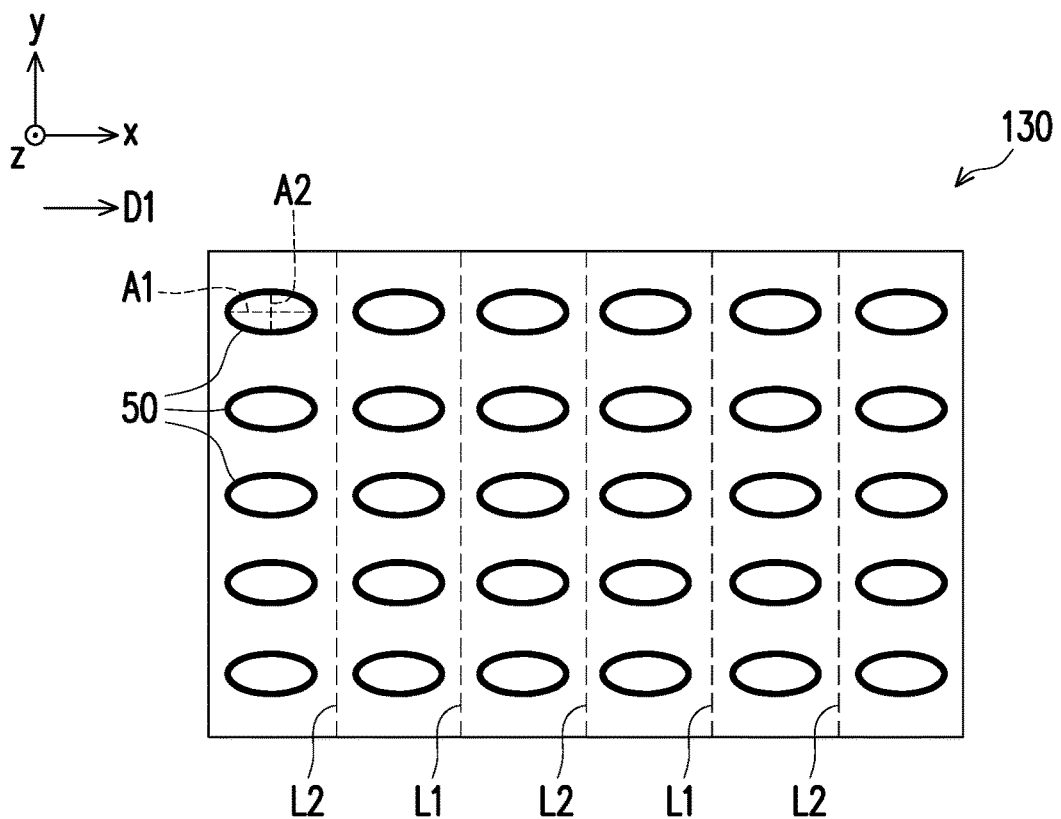
FIG. 3B is a schematic top view of an anisotropic diffusion element of the projection apparatus of FIG. 1.

FIG. 3A is a schematic cross-sectional view of an anisotropic diffusion element of the projection apparatus of FIG. 1. FIG. 3B is a schematic top view of an anisotropic diffusion element of the projection apparatus of FIG. 1. In addition, FIG. 3B also schematically illustrates light spots 50 formed when an exciting beam EB is incident onto the anisotropic diffusion element 130 according to an embodiment.

Referring to FIG. 3A and FIG. 3B, generally speaking, when the exciting beam EB is emitted away from a light emitting surface of the exciting light source module 110, there is a difference between a fast axis and a slow axis for a divergence angle. The fast axis is a major axis A1 of the exciting beam EB (as shown in FIG. 3B), and the slow axis is a minor axis A2 of the exciting beam EB (as shown in FIG. 3B). The exciting beam EB has a larger divergence angle in a direction of the major axis A1, and has a smaller divergence angle in a direction of the minor axis A2. In other words, the exciting beam EB emitted from the light emitting surface of the exciting light source module 110 forms an elliptical cone, such that one light spot 50 formed by the exciting beam EB incident on the anisotropic diffusion element 130 is in an elliptical shape.

In this embodiment, the anisotropic diffusion element 130 has a bent surface 132, and the bent surface 132 of the anisotropic diffusion element 130 includes a plurality of sub-surfaces 132a connected to each other. Each sub-surface 132a is a plane surface. The plurality of sub-surfaces 132a are arranged along the light expanding direction D1 (the x-axis direction as shown in FIG. 3A and FIG. 3B) and extend along the same extending direction (the y-axis direction as shown in FIG. 3A and FIG. 3B). The bent surface 132 of the anisotropic diffusion element 130 is bilaterally symmetric with respect to an optical axis OA of the anisotropic diffusion element 130 in the light expanding direction D1. The light expanding direction D1 is substantially parallel to the fast axis (major axis) of the exciting beam EB, and the extending direction is substantially parallel to the slow axis (minor axis) of the exciting beam EB. Furthermore, at the junction of adjacent two sub-surfaces 132a is a ridge line L1 or a valley line L2, and an extending direction of the ridge line L1 or the valley line L2 is substantially parallel to the slow axis of the exciting beam EB. Herein, the adjacent two sub-surfaces 132a form a convex surface, and the junction of the adjacent two sub-surfaces 132a may be regarded as the ridge line L1. The adjacent two sub-surfaces 132a form a concave surface, and the junction of the adjacent two sub-surfaces 132a may be regarded as the valley line L2.

Figure 3C:
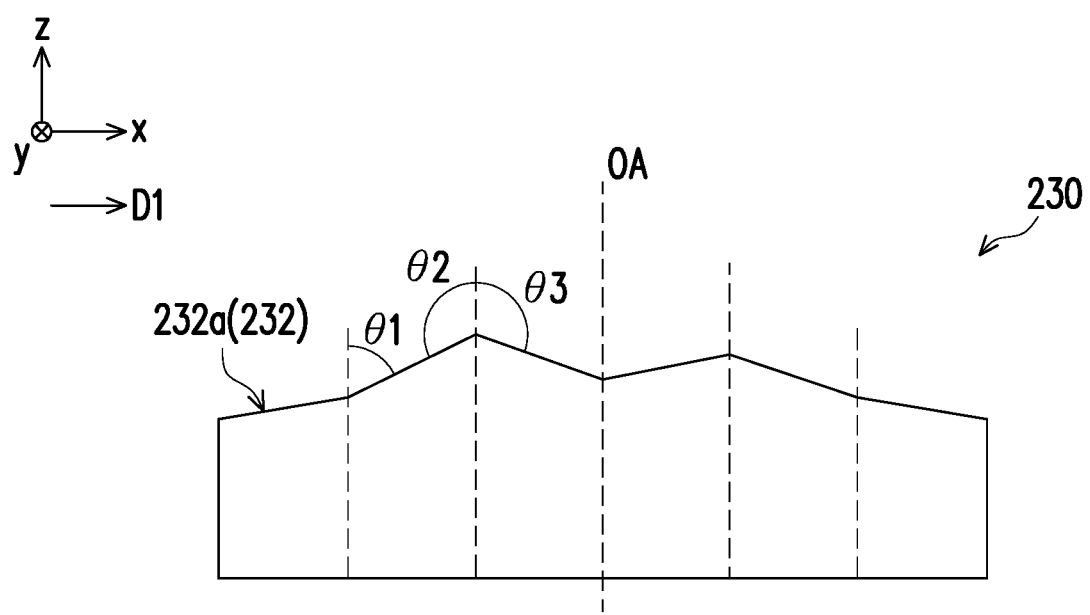
FIG. 3C is a schematic cross-sectional view of an anisotropic diffusion element according to another embodiment of the disclosure.

In this embodiment, the junctions of the plurality of sub-surfaces 132a are, from left to right as shown in FIG. 3A and FIG. 3B, namely, a valley line L2, a ridge line L1, a valley line L2, a ridge line L1, and a valley line L2. In this embodiment, the plurality of sub-surfaces 132a are bilaterally symmetrical in the light expanding direction D1, and any one of the junctions may be the ridge line L1 or the valley line L2. Moreover, in this embodiment, the bent surface 132 of the anisotropic diffusion element 130 faces the exciting light source module 110, so each ridge line L1 is closer to the exciting light source module 110 than each valley line L2 is. In other embodiments, the bent surface 132 of the anisotropic diffusion element 130 may face away from the exciting light source module 110, so each ridge line L1 is farther away from the exciting light source module 110 than each valley line L2 is. Furthermore, in other embodiments, as shown in FIG. 3C, an anisotropic diffusion element 230 has a bent surface 232, and the bent surface 232 includes a plurality of sub-surfaces 232a connected to each other. Each sub-surface 232a is a plane surface. The plurality of sub-surfaces 232a are bilaterally asymmetrical to each other in the light expanding direction D1 with respect to the optical axis OA.

Although the number of the plurality of sub-surfaces 132a and the number of the plurality of sub-surfaces 232a as shown in FIG. 3A, FIG. 3B, and FIG. 3C are respectively six, the disclosure is not limited thereto. The number of the plurality of sub-surfaces 132a and the number of the plurality of sub-surfaces 232a may be larger than six or smaller than six.

It should be noted that, the exciting light source module 110 of this embodiment is a focused light source, and thus, as shown in FIG. 3B, the exciting beam EB may form a plurality of separate light spots 50 on the anisotropic diffusion element 130. In particular, when the exciting light source module 110 includes a plurality of exciting light source elements 112 arranged in an array, the exciting light source elements 112 of the exciting light source module 110 may be arranged into a plurality of columns, and each sub-surface 132a of the anisotropic diffusion element 130 corresponds to one column of the exciting light source elements 112, so an exciting sub-beam emitted by one column of the exciting light source elements 112 may correspondingly form a plurality of light spots 50 on the corresponding sub-surface 132a. However, in other embodiments, the exciting light source module 110 may be a defocused light source, and the exciting beam EB may not form a plurality of separate light spots 50 on the anisotropic diffusion element 130.

Since the anisotropic diffusion element 130 has a plurality of sub-surfaces 132a that are inclined relative to each other, and the plurality of sub-surfaces 132a are arranged along the light expanding direction D1 (such as the x-axis direction in FIG. 3A and FIG. 3B), the anisotropic diffusion element 130 may allow the passing exciting beam EB to expand in the light expanding direction D1. In this embodiment, the light expanding direction D1 is substantially parallel to the fast axis (major axis) of the exciting beam EB, such that the energy intensity distribution on the fast axis of a light spot SP formed on the wavelength converter 120 by the exciting beam EB passing the anisotropic diffusion element 130 is not excessively concentrated in the center. In addition, in the illumination system 100 as shown in FIG. 1, a lens C3 may be disposed between the anisotropic diffusion element 130 and the wavelength converter 120, and the exciting sub-beams emitted by each column of the exciting light source elements 112 pass through the anisotropic diffusion element 130, pass through the lens C3, and then converge on the wavelength converter 120. At the position of the wavelength converter 120 illuminated by the exciting beam EB, the fast axis of the exciting beam EB is substantially parallel to a radial direction of the wavelength converter 120 about a central axis CA, and the slow axis of the exciting beam EB is substantially parallel to a tangential direction of the wavelength converter 120 about the central axis CA. After the exciting beam EB is adjusted by the plurality of sub-surfaces 132a, the energy intensity distribution on the fast axis of the light spot SP formed on the wavelength converter 120 is adjusted to be free from excessively concentrated in the center. For example, the energy intensity distribution on the fast axis of the light spot SP may be lower in the center than on two sides, or may decrease toward the direction of the central axis CA.

In this embodiment, an angle θ between the sub-surface 132a of the anisotropic diffusion element 130 of FIG. 3A and the optical axis OA of the anisotropic diffusion element 130 is, for example, greater than or equal to 5 degrees and less than or equal to 185 degrees, wherein at least a portion of the plurality of sub-surfaces 132a have the same inclination angle with respect to the optical axis OA, and at least a portion of the plurality of sub-surfaces 132a have different inclination angles with respect to the optical axis OA. An angle θ1, an angle θ2 and an angle θ3 between the sub-surfaces 232a of the anisotropic diffusion element 230 of FIG. 3C and the optical axis OA of the anisotropic diffusion element 230 are different, for example, but all fall within the range of greater than or equal to 5 degrees and less than or equal to 185 degrees.

Figure 4A:
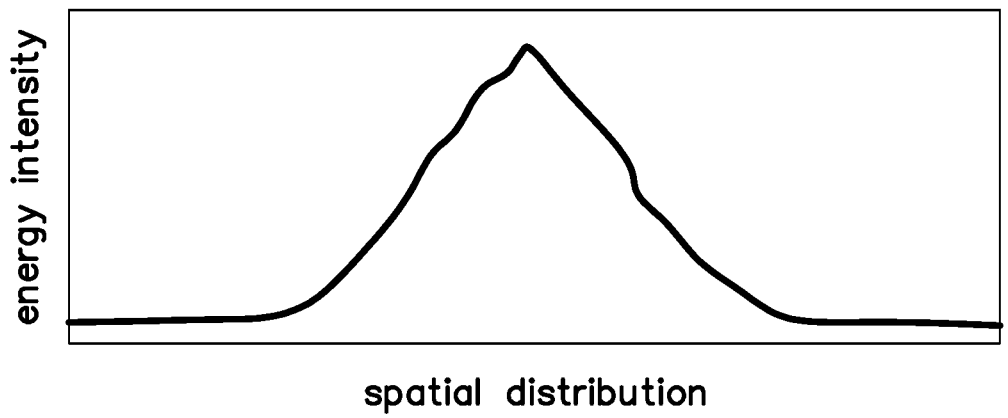
FIG. 4A is an energy intensity distribution diagram of a light spot formed by an exciting beam of a projection apparatus without an anisotropic diffusion element projecting on a wavelength converter along a radial direction.
Figure 4B:
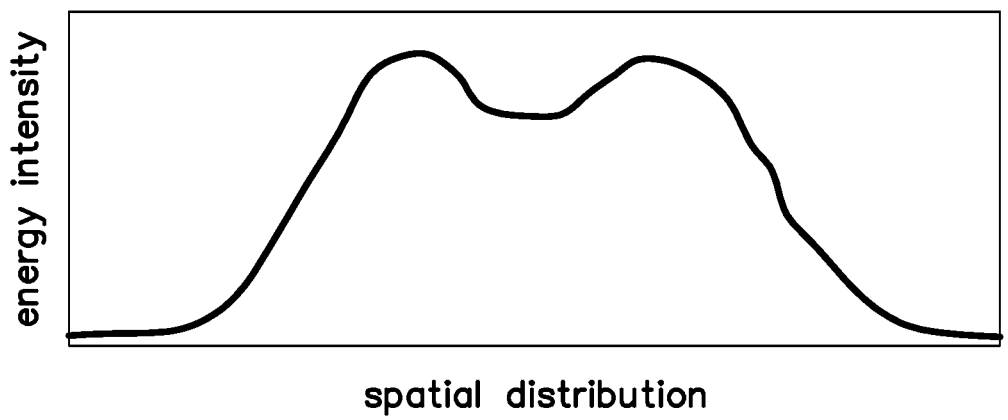
FIG. 4B is an energy intensity distribution diagram of a light spot formed by an exciting beam passing through the anisotropic diffusion element of FIG. 3A and then projecting on the wavelength converter along a radial direction.
Figure 4C:
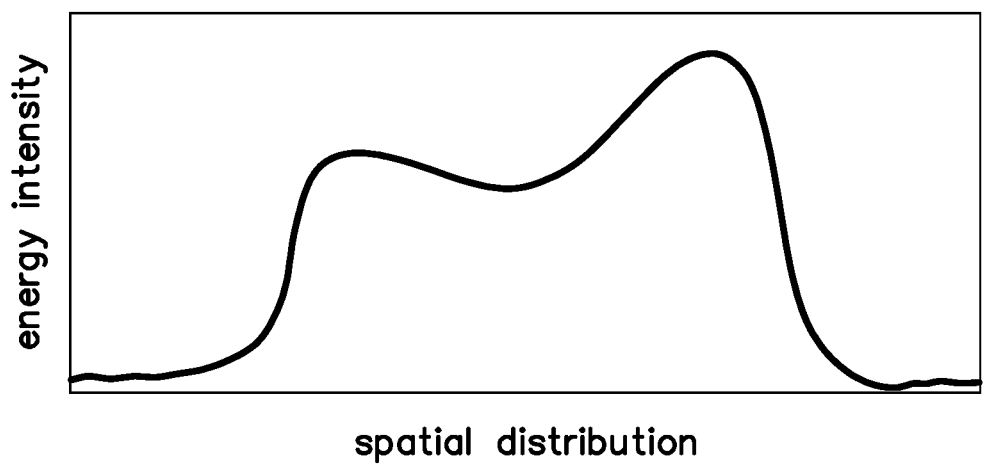
FIG. 4C is an energy intensity distribution diagram of a light spot formed by an exciting beam passing through the anisotropic diffusion element of FIG. 3C and then projecting on the wavelength converter along a radial direction.

FIG. 4A is an energy intensity distribution diagram of a light spot formed by an exciting beam of a projection apparatus without an anisotropic diffusion element projecting on a wavelength converter along a radial direction. FIG. 4B is an energy intensity distribution diagram of a light spot formed by an exciting beam passing through the anisotropic diffusion element of FIG. 3A and then projecting on the wavelength converter along a radial direction. FIG. 4C is an energy intensity distribution diagram of a light spot formed by an exciting beam passing through the anisotropic diffusion element of FIG. 3C and then projecting on the wavelength converter along a radial direction. The number of the plurality of sub-surfaces 132a of the anisotropic diffusion element 130 of FIG. 3A is six, for example, and the angles between each of the plurality of sub-surfaces 132a and the optical axis OA, are, from left to right, namely 84.5 degrees, 83 degrees, 85.5 degrees, 85.5 degrees, 83 degrees, and 84.5 degrees. The junctions of the plurality of sub-surfaces 132a are, from left to right, namely a valley line L2, a ridge line L1, a valley line L2, a ridge line L1, and a valley line L2.

As shown in FIG. 4A, when the projection apparatus does not have an anisotropic diffusion element, the energy intensity of the light spot along the radial direction about the central axis, wherein the light spot is formed by the exciting beam illuminating on the wavelength converter, is stronger in the center and rapidly reducing on the two sides. As shown in FIG. 1, FIG. 2 and FIG. 4B, when the projection apparatus 100 has an anisotropic diffusion element 130 as in FIG. 3A, after the exciting beam EB emitted from the exciting light source module 110 passes through the anisotropic diffusion element 130, the energy intensity of the light spot SP along the radial direction about the central axis CA, wherein the light spot SP is formed by the exciting beam EB illuminating on the wavelength converter 120, is lower in the center and higher on the two sides. Furthermore, in other embodiments, as shown in FIG. 1, FIG. 2 and FIG. 4C, when the projection apparatus 100 is disposed with an anisotropic diffusion element 230 as in FIG. 3C, the energy intensity of the light spot along the radial direction about the central axis CA, wherein the light spot is formed by the exciting beam EB illuminating on the wavelength converter 120, is reducing toward the direction of the central axis CA.

In light of the above, in the embodiments of the disclosure, with the anisotropic diffusion element 130 or the anisotropic diffusion element 230, the exciting beam EB passing through the same may expand in the direction of the fast axis. As such, the energy intensity distribution of a light spot formed by the exciting beam EB on the wavelength converter 120 is not excessively concentrated in the center, which may prevent the conversion efficiency of the wavelength converter 120 from reducing and prevents the wavelength converter 120 from burning out. In addition, the wavelength converter 120 is a rotating element. Through the design of the anisotropic diffusion element 130, the energy intensity distribution of the light spot which is lower in the center and higher on the two sides along the radial direction may reduce the thermal energy accumulation from the center diffusing toward the two sides, such that the light spot is in a similar temperature in the center and on the two sides, which benefits in maintaining the conversion efficiency. Alternatively, through the design of the anisotropic diffusion element 230, the energy intensity distribution of the light spot which is reducing toward the direction of the central axis CA along the radial direction may reduce the thermal energy accumulation on the inner ring of the rotating element, such that the light spot is in a similar temperature in the internal and external sides along the radial direction.

Referring to FIG. 1 again, the illumination system 100 further includes a light combining unit 150 and a light transmission module 160. The light combining unit 150 is located between the exciting light source module 110 and the wavelength converter 120, and is located on the transmission paths of a conversion beam CB1, a conversion beam CB2 and the exciting beam EB passing through the wavelength converter 120. The light transmission module 160 is located on the transmission path of the exciting beam EB passing through the wavelength converter 120. Specifically, the light combining unit 150 may be a color separating unit, such as a dichroic mirror (DM) or a dichroic prism, and may provide different optical effects on beams in different colors. For example, in this embodiment, the light combining unit 150, for example, allows the blue exciting beam to pass through, and reflects the beams in other colors (such as red, green and yellow, etc.). The light transmission module 160 may include a plurality of lenses 162 and reflective mirrors 164 disposed between the plurality of lenses 162, which are configured to guide the exciting beam EB passing through the wavelength converter 120 back to the light combining unit 150.

In this embodiment, the light combining unit 150 may be designed for the exciting beam EB to pass through and reflecting the conversion beam CB1 and the conversion beam CB2. Therefore, the exciting beam EB emitted from the exciting light source module 110 passes through the light combining unit 150 and transmits to the wavelength converter 120, and after the light transmission module 160 guides the exciting beam EB passing through the wavelength converter 120 back to the light combining unit 140, the combining unit 150 may combine the conversion beam CB1 and the conversion beam CB2 emitting from the wavelength converter 120 with the exciting beam EB passing through the wavelength converter 120.

In this embodiment, the illumination system 100 further includes a light filter assembly 170 and a light uniforming element 180 disposed on the transmission paths of the exciting beam EB, the conversion beam CB1 and the conversion beam CB2 from the light combining unit 150. The light filter assembly 170 is configured to filter out beams having a wavelength falling out of a specific wavelength range and allowing beams having a wavelength falling within this specific range to pass through, so as to improve the color purity of the color light. In this embodiment, the light filter assembly 170 is, for example, a filter wheel or any other optical element having an of effect of color filtering, and the light uniforming element 180 is, for example, a light integration rod configured to uniform the beams from the light filter assembly 170 and forming the illumination beam IB, but the disclosure is not limited thereto. In addition, the illumination system 100 may also include one or more lenses, such as a lens C1 located between the exciting light source module 110 and the anisotropic diffusion element 130, or a lens C2 located between the light combining element 150 and the light filter assembly 170, or a lens C3 located between the light combining element 150 and the wavelength converter 120, so as to adjust a beam path inside the illumination system 100.

As shown in FIG. 1, the projection apparatus 200 of this embodiment further includes a light valve 210 and a projection lens 220. The light valve 210 is disposed on a transmission path of the illumination beam IB for modulating the illumination beam IB into an image beam IMB. The projection lens 220 is disposed on a transmission path of the image beam IMB and is configured to project the image beam IMB onto a screen or a wall (not illustrated) to form an image. Since that after the illumination beams IB in different colors are illuminated on the light valve 210, the light valve 210 sequentially converts the illumination beams IB in different colors into the image beam IMB and transmits the image beam IMB to the projection lens 220, the image formed by the image beam IMB projected out of the projection apparatus 200 and converted by the light valve 210 is a color image.

In this embodiment, the light valve 210 is, for example, a digital micro-mirror device (DMD) or a liquid-crystal-on-silicon panel (LCOS panel). However, in other embodiments, the light valve 210 may also be a transmissive liquid crystal panel or any other spatial light modulator. In this embodiment, the projection lens 220 is, for example, a combination including one or more optical lenses having a refractive power, and the optical lenses include a non-flat lens, such as a biconcave lens, a biconvex lens, a concave-convex lens, a convex-concave lens, a plano-convex lens, a plano-concave lens, or a variety of combinations thereof. The disclosure does not limit the type and kind of the projection lens 220.

In sum of the above, in the illumination system and the projection apparatus of the embodiments of the disclosure, the anisotropic diffusion element may allow the passing exciting beam to expand in the light expanding direction, and the light expanding direction is substantially parallel to the fast axis of the exciting beam, so when the wavelength converter is illuminated by the exciting beam passing the anisotropic diffusion element, the energy intensity distribution of a light spot formed by the exciting beam on the wavelength converter is not excessively concentrated in the center, which may prevent the conversion efficiency of the wavelength converter from reducing and prevent the wavelength converter from burning out. Therefore, the illumination system according to the embodiments of the disclosure has better illumination uniformity, a better light efficiency and a longer life. Accordingly, the projection apparatus according to the embodiments of the disclosure, which includes the aforementioned illumination system, has a better image quality, a better light efficiency and a longer life.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. An illumination system, comprising an exciting light source module, a wavelength converter and an anisotropic diffusion element, wherein
   the exciting light source module is configured to emit an exciting beam;
   the wavelength converter is disposed on a transmission path of the exciting beam; and
   the anisotropic diffusion element is disposed on the transmission path of the exciting beam and located between the exciting light source module and the wavelength converter, wherein the anisotropic diffusion element allows the passing exciting beam to expand in a light expanding direction, and the light expanding direction is parallel to a fast axis of the exciting beam,
   wherein the wavelength converter is configured to rotate around a central axis, and at a position of the wavelength converter illuminated by the exciting beam, the fast axis of the exciting beam is parallel to a radial direction of the wavelength converter about the central axis.

2. The illumination system according to claim 1, wherein after the exciting beam emitted from the exciting light source module passes through the anisotropic diffusion element, the exciting beam forms a light spot on the wavelength converter, and an energy intensity distribution of the light spot along the radial direction about the central axis is lower in a center and higher on two sides.

3. The illumination system according to claim 1, wherein the anisotropic diffusion element has a bent surface, the bent surface comprises a plurality of sub-surfaces connected to each other, wherein the plurality of sub-surfaces are arranged along the light expanding direction and extend along a same extending direction, and the extending direction is parallel to a slow axis of the exciting beam.

4. The illumination system according to claim 3, wherein the exciting light source module comprises a plurality of exciting light source elements, the exciting light source elements are arranged into a plurality of columns, and each of the plurality of sub-surfaces of the anisotropic diffusion element corresponds to one column of the exciting light source elements, wherein an exciting sub-beam emitted by the one column of the exciting light source elements forms a plurality of light spots on the corresponding sub-surface.

5. The illumination system according to claim 3, wherein at a junction of adjacent two sub-surfaces of the plurality of sub-surfaces exists a ridge line or a valley line, and the ridge line or the valley line is parallel to the slow axis of the exciting beam.

6. The illumination system according to claim 3, wherein at least a portion of the plurality of sub-surfaces have a same inclination angle with respect to an optical axis of the anisotropic diffusion element.

7. The illumination system according to claim 3, wherein at least a portion of the plurality of sub-surfaces have different inclination angles with respect to an optical axis of the anisotropic diffusion element.

8. The illumination system according to claim 1, wherein the wavelength converter comprises at least one wavelength conversion area and at least one light transmission area, when the wavelength converter rotates around the central axis, the at least one wavelength conversion area and the at least one light transmission area are configured to cut into the transmission path of the exciting beam in turns, when the at least one light transmission area cuts into the transmission path of the exciting beam, the exciting beam passes through the at least one light transmission area of the wavelength converter, and when the at least one wavelength conversion area cuts into the transmission path of the exciting beam, the exciting beam is converted to at least one conversion beam by the at least one wavelength conversion area, and the illumination system further comprises:
 a light combining unit, located between the exciting light source module and the wavelength converter and located on transmission paths of the at least one conversion beam and the exciting beam passing through the wavelength converter.

9. The illumination system according to claim 8, wherein the light combining unit is located on the transmission path of the exciting beam emitted from the exciting light source module, and the light combining unit is configured to transmit the exciting beam emitted from the exciting light source module to the wavelength converter and to reflect the at least one conversion beam emitting from the wavelength converter.

10. A projection apparatus, comprising an illumination system, a light valve and a projection lens, wherein
 the illumination system is configured to provide an illumination beam, the illumination system comprises an exciting light source module, a wavelength converter and an anisotropic diffusion element, wherein
 the exciting light source module is configured to provide an exciting beam;
 the wavelength converter is disposed on a transmission path of the exciting beam; and
 the anisotropic diffusion element is disposed on the transmission path of the exciting beam and located between the exciting light source module and the wavelength converter, wherein the anisotropic diffusion element allows the passing exciting beam to expand in a light expanding direction, and the light expanding direction is parallel to a fast axis of the exciting beam;
 the light valve is disposed on a transmission path of the illumination beam for modulating the illumination beam into an image beam; and
 the projection lens is disposed on a transmission path of the image beam,
 wherein the wavelength converter is configured to rotate around a central axis, and at a position of the wavelength converter illuminated by the exciting beam, the fast axis of the exciting beam is parallel to a radial direction of the wavelength converter about the central axis.

11. The illumination system according to claim 10, wherein after the exciting beam emitted from the exciting light source module passes through the anisotropic diffusion element, the exciting beam forms a light spot on the wavelength converter, and an energy intensity distribution of the light spot along the radial direction about the central axis is lower in a center and higher on two sides.

12. The illumination system according to claim 10, wherein the anisotropic diffusion element has a bent surface, the bent surface comprises a plurality of sub-surfaces connected to each other, wherein the plurality of sub-surfaces are arranged along the light expanding direction and extend along a same extending direction, and the extending direction is parallel to a slow axis of the exciting beam.

13. The illumination system according to claim 12, wherein the exciting light source module comprises a plurality of exciting light source elements, the exciting light source elements are arranged into a plurality of columns, and each of the plurality of sub-surfaces of the anisotropic diffusion element corresponds to one column of the exciting light source elements, wherein an exciting sub-beam emitted by the one column of the exciting light source elements forms a plurality of light spots on the corresponding sub-surface.

14. The illumination system according to claim 12, wherein at a junction of adjacent two sub-surfaces of the plurality of sub-surfaces exists a ridge line or a valley line, and the ridge line or the valley line is parallel to a slow axis of the exciting beam.

15. The illumination system according to claim 12, wherein at least a portion of the plurality of sub-surfaces have a same inclination angle with respect to an optical axis of the anisotropic diffusion element.

16. The illumination system according to claim 12, wherein at least a portion of the plurality of sub-surfaces have different inclination angles with respect to an optical axis of the anisotropic diffusion element.

17. The illumination system according to claim 10, wherein the wavelength converter comprises at least one wavelength conversion area and at least one light transmission area, when the wavelength converter rotates around the central axis, the at least one wavelength conversion area and the at least one light transmission area are configured to cut into the transmission path of the exciting beam in turns, when the at least one light transmission area cuts into the transmission path of the exciting beam, the exciting beam passes through the at least one light transmission area of the wavelength converter, and when the at least one wavelength conversion area cuts into the transmission path of the exciting beam, the exciting beam is converted to at least one conversion beam by the at least one wavelength conversion area, and the illumination system further comprises:

a light combining unit, located between the exciting light source module and the wavelength converter and located on transmission paths of the at least one conversion beam and the exciting beam passing through the wavelength converter.

18. The illumination system according to claim 17, wherein the light combining unit is located on the transmission path of the exciting beam emitted from the exciting light source module, and the light combining unit is configured to transmit the exciting beam emitted from the exciting light source module to the wavelength converter and to reflect the at least one conversion beam emitting from the wavelength converter.

\* \* \* \* \*